(12) United States Patent
Tucker

(10) Patent No.: US 7,513,008 B2
(45) Date of Patent: Apr. 7, 2009

(54) SAND WAND ASSEMBLY

(76) Inventor: Randall L. Tucker, 7440 Township Rd. 95, Findlay, OH (US) 45850

( * ) Notice: Subject to any disclaimer, the term of this patent is extended or adjusted under 35 U.S.C. 154(b) by 568 days.

(21) Appl. No.: 10/515,978

(22) PCT Filed: May 23, 2003

(86) PCT No.: PCT/US03/16441

§ 371 (c)(1),
(2), (4) Date: Feb. 28, 2005

(87) PCT Pub. No.: WO03/099093

PCT Pub. Date: Dec. 4, 2003

(65) Prior Publication Data

US 2006/0048334 A1  Mar. 9, 2006

Related U.S. Application Data

(60) Provisional application No. 60/382,907, filed on May 23, 2002.

(51) Int. Cl.
A47L 5/14 (2006.01)

(52) U.S. Cl. .............. 15/320; 15/321; 15/322; 15/300.1

(58) Field of Classification Search .......... 15/345, 15/321, 322, 300.1, 350; 134/21
See application file for complete search history.

(56) References Cited

U.S. PATENT DOCUMENTS

| 1,491,202 | A |   | 4/1924  | Early |        |
|-----------|---|---|---------|-------|--------|
| 1,987,907 | A |   | 1/1935  | Jenkins |      |
| 3,464,081 | A |   | 9/1969  | Wisner |       |
| 3,591,889 | A | * | 7/1971  | Wisher | 15/321 |
| 3,774,262 | A | * | 11/1973 | Anthony et al. | 15/322 |
| 4,696,075 | A |   | 9/1987  | Grave |        |
| 4,825,501 | A |   | 5/1989  | Ashby et al. |  |
| 4,946,104 | A |   | 8/1990  | Smrt |         |
| 4,998,317 | A |   | 3/1991  | Passien |      |
| 5,142,730 | A | * | 9/1992  | Braks et al. | 15/327.5 |
| 5,180,439 | A | * | 1/1993  | Allison | 134/21 |
| 5,206,970 | A |   | 5/1993  | Johnson |      |
| 5,291,697 | A |   | 3/1994  | Nelson |       |
| 5,336,170 | A | * | 8/1994  | Salerno et al. | 604/24 |
| 5,485,651 | A |   | 1/1996  | Payeur |       |
| 5,706,548 | A | * | 1/1998  | Schabacker | 15/322 |
| 5,716,260 | A |   | 2/1998  | Griffin et al. | |
| 5,722,111 | A |   | 3/1998  | Sowell et al. |  |
| 5,860,232 | A | * | 1/1999  | Nathenson et al. | 37/466 |
| 5,898,970 | A | * | 5/1999  | Straiton | 15/321 |
| 5,991,968 | A |   | 11/1999 | Moll et al. |   |
| 6,129,094 | A |   | 10/2000 | Moll et al. |   |
| 6,158,512 | A |   | 12/2000 | Unsgaard |    |
| 6,330,915 | B1 |  | 12/2001 | Moya |         |
| 6,391,208 | B2 |  | 5/2002  | Burrow |       |
| 2006/0048334 | A1 | * | 3/2006 | Tucker | 15/345 |

* cited by examiner

Primary Examiner—Lee D Wilson
(74) Attorney, Agent, or Firm—Fay Sharpe LLP

(57) ABSTRACT

An apparatus and method for removing sediment from a waterway using a high pressure water spray and a suction line (22) is disclosed. The high pressure water is directed through a pressure line (20) that may be mounted inside the suction line (22). The high pressure water helps to suspend sediment that has settled in the waterway. Water and suspended sediment is then vacuumed up by the suction line (22) and deposited outside the water for further treatment or disposal. The apparatus (12) is designed to be hand-held by an individual situated in the waterway, such that great control over which specific locations within the waterway are being treated.

15 Claims, 6 Drawing Sheets

SAND WAND ASSEMBLY

This application claims the benefit of International Application No. PCT/US03/16441, International Filing Date 23 May 2003 and U.S. Provisional Application Ser. No. 60/382,907, filed May 23, 2002.

FIELD OF INVENTION

The present invention relates to particulate collection devices. More particularly, the present invention relates to a system and method for collecting sand, sludge and sediment from a waterway.

BACKGROUND OF THE INVENTION

It is often desirable to remove sediment and other particulate matter from a waterway such as a stream, river, channel bed, tidal pool, or estuary pool. Sediments are often soils eroded from farmland, forests, and runoff from city streets, carried by surface water, and accumulated in channel bottoms. The sediments are typically sand and silts that have been carried by the waterway or along a lake shoreline by littoral currents and deposited in the deepened channel. A dredged material may be a clean soil or may have contaminants that came from a number of possible sources including urban runoff, sewer overflows, mining, etc.

Whatever the source, sediment removal from a channel bed is often done for a variety of reasons, including removing sediments to improve a spawning area, improving navigation by removing sand bars, removing contaminated sediment from industrial runoff in streams, and removing sediment from aqueduct and generating station intakes.

A common way to remove sediment from streams is by dredging. In conventional mechanical dredging techniques, a crane with a bucket scoops sediment from a bottom surface of the waterway and deposits the sediment in a barge or vehicle for transport to a remote location. While effective, such dredging techniques require expensive equipment and are costly to operate. In addition, conventional "grab type" dredging techniques such as "clamshell bucket" or "drag line bucket" are designed to operate without concern for excess sediment spilling out of the buckets during operation, i.e., sediment is stirred up in the waterway and fouls downstream locations. These dredging techniques commonly produce a flume of waterborne sediments that are widely dispersed by the prevailing currents. Thus, the conventional grab type dredges are not well suited for the retrieval of contaminated marine sediments. On the other hand, hydraulic dredging produce a large volume of associated water, which is usually directed to a settling pond and returned to the waterway after the sediment has settled. When the soil contains contaminated sediments, the associated water must be treated using a remediation process before it is returned to the waterway. This requirement increases the degree of difficulty and cost of a project.

Another alternative to dredging is to use the applicant's collector assembly as shown and described in U.S. Pat. Nos. 6,042,733 and 6,346,199. One or more collectors are mounted in the waterway and sediment that collects in the assembly is periodically pumped on shore. This collector assembly has proven to be especially effective at removing sediment from waterways. Typically, a pump is disposed outside of the waterway and, oftentimes, associated with an ejector to provide suction to a sediment removal passage. The sediment is separated from the water by passing through a filter and clean, filtered water returned to the waterway. These systems do not adequately address the need for a mobile or portable sediment removal.

SUMMARY OF THE INVENTION

In one aspect, the present invention provides an apparatus for collecting sediment from a waterway, the apparatus comprising a water pressure line, a suction line, a valve assembly mounted on the pressure line, and a nose on an end of the suction line.

In another aspect, the invention provides a method for removing sediment from a waterway, the method including the steps of dispensing high pressure fluid from a pressure line mounted in a hand-held housing for providing a high pressure against a sediment containing surface in the waterway to stir up sediment, applying a reduced pressure to a suction line mounted in the housing to vacuum water and sediment stirred up by the high pressure fluid, separating the water from the sediment, and returning the separated water to the waterway.

One advantage of the invention resides in the mobility provided in removing sediment from a waterway.

Another advantage is found in the ability to easily and effectively change the balance of the assembly.

Yet another advantage relates to the durable nature of the assembly that may be selectively varied in operation to accommodate different conditions.

Still other features and benefits of the invention will become apparent to those skilled in the art upon reading and understanding the following detailed description of the invention.

BRIEF DESCRIPTION OF THE DRAWINGS

The present invention will be described in detail with several preferred embodiments and illustrated, merely by way of example and not with intent to limit the scope thereof, in the accompanying drawings.

DETAILED DESCRIPTION OF THE INVENTION

Figure 1:
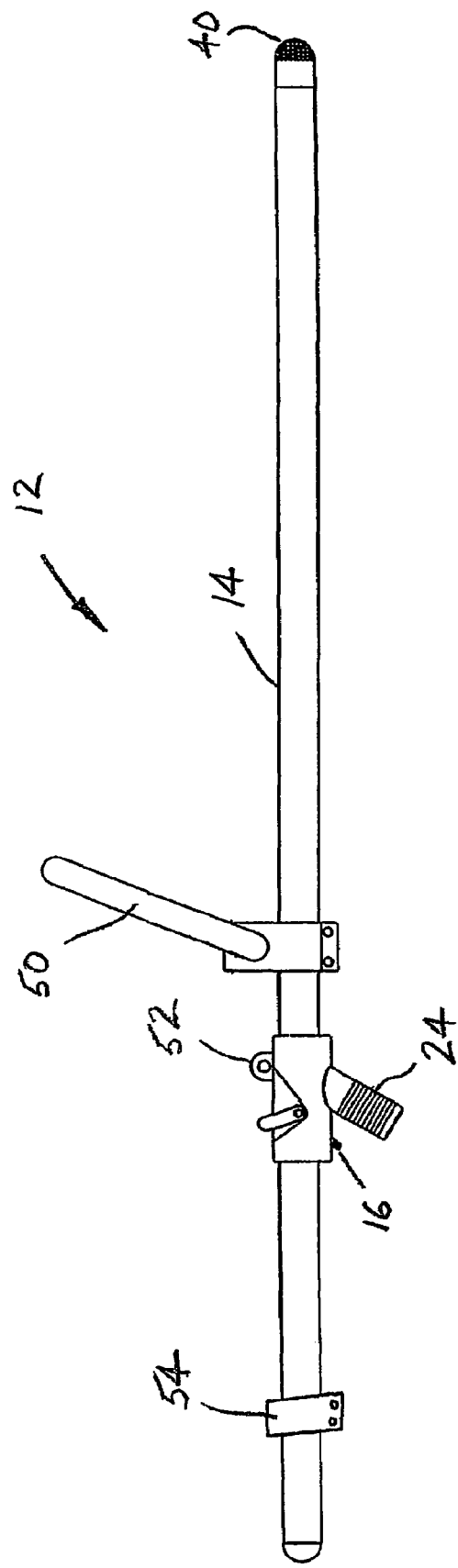
FIG. 1 is a side view of a sand wand assembly in accordance with one embodiment of the present invention.

With reference to FIG. 1, a handheld sand wand 12 for removing sediment and other material from a waterway is shown in accordance with one embodiment of the present invention. As used herein, the term "sediment" is not meant to be limiting and is intended to encompass any material that is desired to be removed from a waterway including, but not limited to, silt, sand, sewage, soil, organic and inorganic waste, runoff, etc. Similarly, a "waterway" is not intended to be limiting in any way and is meant to encompass any flowing or standing waterway such as streams, rivers, ponds, lakes, canals, estuary and tidal pools, and channels, both natural and man-made.

The sand wand 12 comprises an elongated, hollow housing 14 through which water and sediment pass. More particularly, and as additionally shown in FIG. 2, the housing 14 contains a connector 16 that connects with water pressure line 20 and a suction line 22 that communicates with the source of vacuum via connector 24. In a first embodiment, the pressure line 20 and the suction line 22 are positioned in a coaxial arrangement, with the pressure line 20 preferably nested inside the suction line 22. In this arrangement, an outer surface 26 of the suction line forms the housing, with the pressure line 20 positioned inside the suction line 22. Of course, other arrangements are contemplated by the invention, such as the pressure line 20 and the suction line 22 positioned in side-by-side relation or disposed inside a separate housing (not shown). Alternatively, the coaxial relationship could be reversed. Both the suction line 22 and the pressure line 20 can be of varying sizes. Although not meant to be limiting, the suction line has an inside diameter of from about one inch to about four inches, the pressure line in turn, has an interior diameter of from about one-eighth inch to about one-half inch. As will be appreciated, the dimensions may vary to meet the particular needs for the sand wand assembly. For instance, the pressure line provides for pressurized fluid (water) to pass through the sand wand assembly and exit at one thereof while the pressurized water is directed to stir up sediment in the waterway. The suction line, on the other hand, is exposed to a vacuum force or suctions and removes the water with stirred up sediment from the waterway where it is treated as will be described in greater detail below.

A valve assembly 30, such as a ball valve, is provided in the assembly to control the flow of water through the pressure line 20. Preferably, the position of the valve may be varied, thereby allowing a user to make selective incremental adjustments in the amount of water flowing through the pressure line 20. Seals in the valve are preferably made from a non-corroding, chemical, oxidative and weather resistant material such as Viton, a registered trademark of E.I. DuPont de Nemours Company. Of course, alternative seal materials may be used without departing from the scope and intent of the present invention.

The pressure line 20, valve assembly 30, and suction line 22 are preferably made from a rigid, non-corroding material that is resistant to bending and fracturing and the abrasive effects of the pressurized water and water/sediment mix. For example, a preferred arrangement of the pressure line 20 and suction line 22 uses stainless steel and/or aluminum, although other materials such as rigid thermoplastic, or other non-corroding metals may be used.

Figure 2:
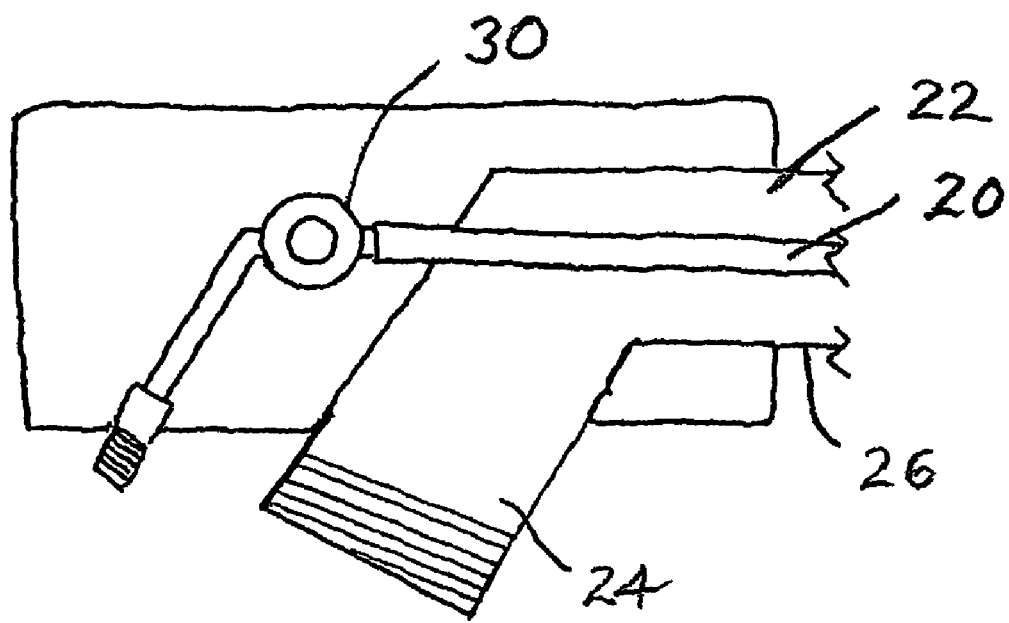
FIG. 2 is a cutaway side view of the valve assembly of the sand wand in accordance with one embodiment of the present invention.

As more particularly shown in FIG. 2, the valve assembly 30 is disposed in the pressure line 20 downstream of a convention connector or fitting that sealing connects to a high pressure source. The pressure line 20 is preferably centrally positioned in suction line 22, which also includes a conventional connector (e.g., threads, quick connect, etc.) for receiving water and sediment from line 22 and conveying it to a vacuum source such as an ejector.

Figure 3:
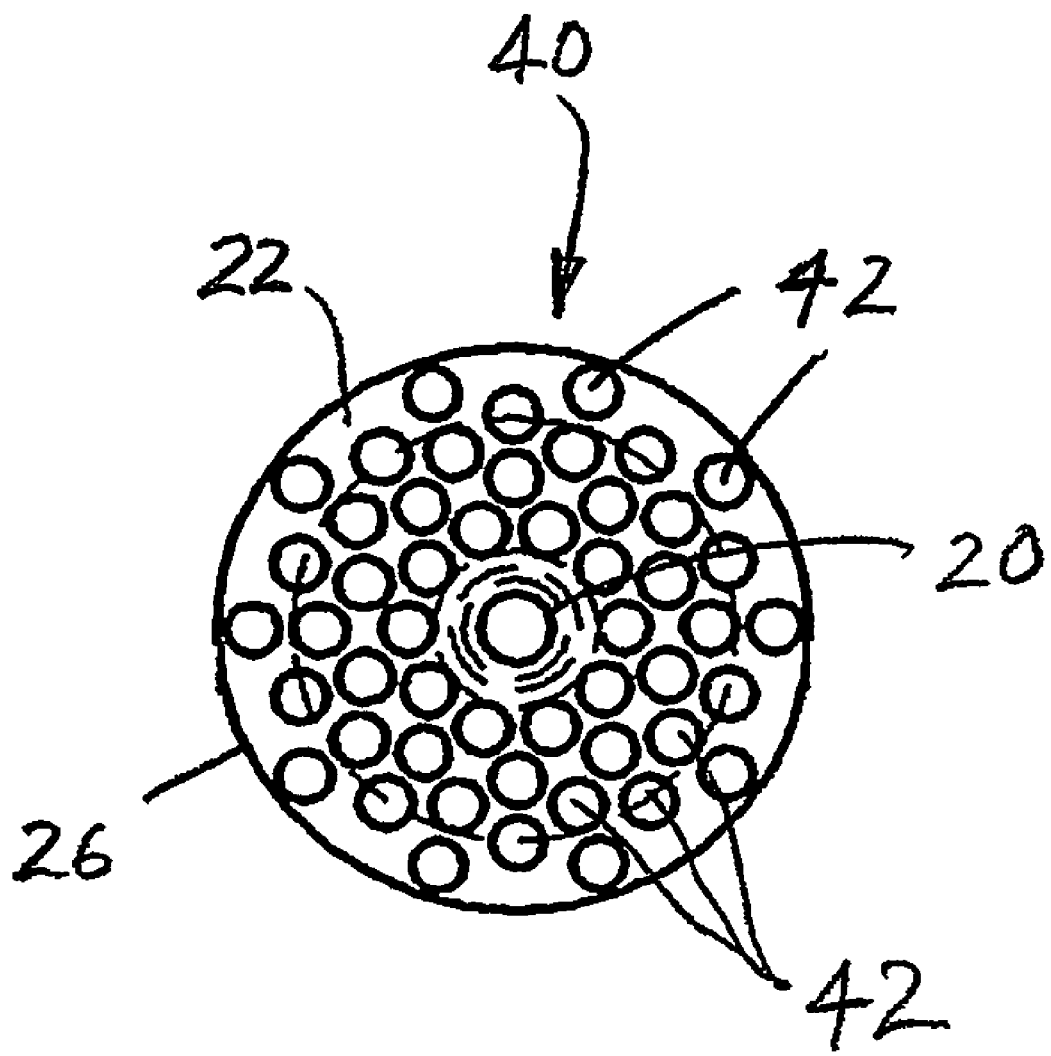
FIG. 3 is a head-on view of the nose of the sand wand in accordance with one embodiment of the present invention.

With reference to FIG. 3, an end or nose 40 is shown in accordance with one embodiment of the present invention. An end of the pressure line 20 preferably protrudes through a center of the nose 40. Disposed on the nose and generally surrounding the pressure line 20 is a plurality of suction orifices 42 through which sediment is removed from the waterway. Although shown as being circular in FIG. 3, the orifices 42 may adopt a wide number of shapes. The orifices 42 are preferably sized such that they will only admit sediment having a particle size that will easily pass through the suction line 22. That is, the orifices 42 are preferably sized such that they will prevent sediment having a particulate size that is so large that the sediment is likely to become lodged in the suction line 22 from entering the tube. Thus, although not intended to be limiting, a 2-inch diameter suction line 22 would typically have a nose with an orifice diameter size of from about 0.2 to about 0.6 inches.

In operation, the sand wand is preferably held by an individual operator. An optional handle 50 assists the operator in holding/controlling the sand wand and a shoulder strap (not shown) is preferably attached to the apparatus at an eyelet 52 on the valve assembly. A counterweight 54 is provided on the housing to effectively balance the nose of the sand wand in the hands of the operator. Alternatively, the counterweight is defined by a number of weights that are received in the housing at an end opposite from the nose. The individual weights can be removed or added to the sand wand assembly to provide desired counterbalancing by simply removing an end cap on the housing and adding or subtracting a selected number of weights from the sand wand. Thus, the extended portion of the sand wand housing beyond the external connections is primarily for counterbalancing and ease of manipulation by the operator. Since the sand wand 12 is manually operated, it finds particular usefulness in the remediation of shallow streams and rivers, for example, in which the operator stands in the waterway and the nose of the suction line is usually located under the water. In addition, by being manually manipulated, the sand wand allows unprecedented control over which specific locations within a waterway are to be treated.

Figure 4:
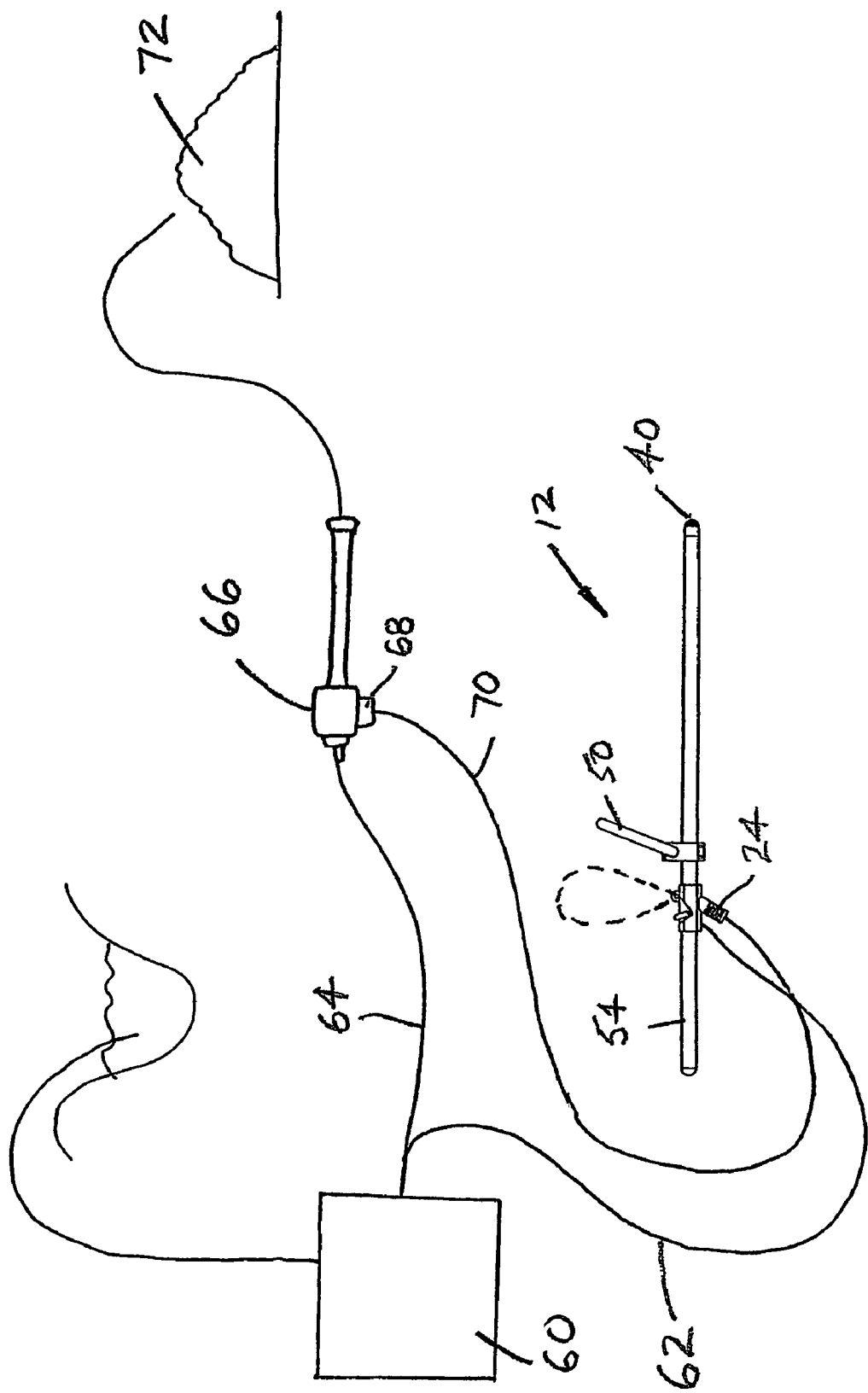
FIG. 4 is a schematic diagram showing the sediment removal process in accordance with one embodiment of the present invention.

With reference to FIG. 4, a single speed or variable speed pump 60 pumps water through a first supply hose or tube 62 to the inlet valve stem on the valve assembly and through a second supply hose or tube 64 to an ejector 66. The water is typically drawn from a remote or distant area of the waterway. The water is preferably drawn from a clean region of the waterway, i.e., a region without a large sediment content. This will ensure that the pump 60 operates smoothly and that the pump life is not unduly shortened due to large amounts of sediment contaminating the interior components of the pump. Any pressure-generating pump with sufficient gallon per minute (gpm) flow can be used. Thus, the pump can be gasoline, diesel, solar or electric powered.

The water supplied to the inlet valve stem is sent through the pressure line and is ejected as a high-pressure jet of water at the nose. This high-pressure jet of water is directed at the bottom or other surface of the waterway that contains sediment, effectively stirring up sediment and suspending it temporarily in the waterway. The sediment and water suspension is then collected through the orifices and into the suction line 22. The suctioning force is provided by the ejector 66 which is capable of generating a reduced pressure in the suction line, thus allowing water and sediment to be vacuumed through the suction line and directed for treatment or disposal. In one embodiment illustrated in the accompanying FIGURES the ejector 66 is a housed venturi jet with pressurized water supplied by the pump through the second supply hose 64.

Figure 5:
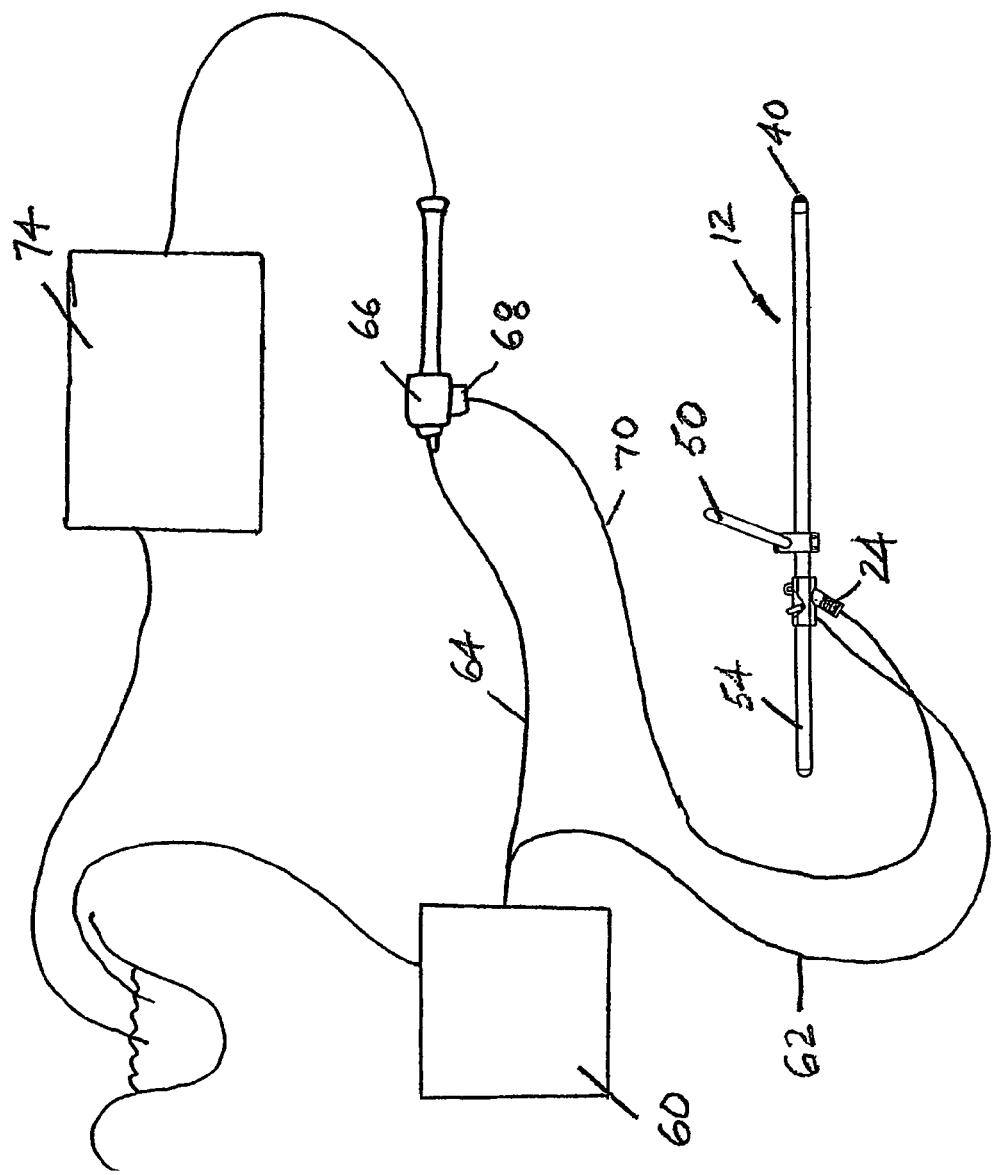
FIG. 5 is a schematic diagram showing the sediment removal process in accordance with a second embodiment of the present invention.

In this embodiment, passing of this pressurized water through the venturi creates a vacuum, which generates a suction force on an input nozzle 68 of the ejector. This input nozzle 68 is connected to the outlet connector and thus the valve of the sand wand assembly by a connection hose 70. This creates a suctioning force that draws sediment from the waterway, through the nose into the suction line, from the suction line through the connection hose 70, and into the ejector 66. In the ejector, the sediment is mixed with the high pressure water from the second supply hose and the resulting effluent is carried to a pile or hopper 72 to be disposed of or separated. Alternately, as shown in FIG. 5, the effluent may be directed to a filter 74, which separates the water from the sediment and returns clean water to the waterway.

All components of the above-described system are sized to provide optimum results. Pump 60 and ejector 66 size are important considerations. Thus, in a preferred embodiment, a typical pump will preferably produce at least one hundred psi water pressure at the ejector to generate sufficient vacuum or suction force for the sand wand. Therefore, a pump that produces at least this pressure, taking into consideration all factors such as ejector size, suction line diameter, and elevation to which the water is to be pumped, is provided. For example, in a typical installation with the ejector sitting approximately ten feet above the waterway and pumping the effluent fifty feet, a two-inch ejector generates a suction of about thirty to about forty gpm through the suction line with a pump supplying water to the ejector at approximately one hundred psi.

The pressure and flow of the water exiting the pressure line is regulated using the valve. Thus, the water pressure directed through the sand wand is manually controlled in response to the desires/commands of an operator and the conditions of the waterway. For example, in especially turbid water, the use of a water jet may be minimally required to suspend sediment and the valve can be turned toward a closed position. Likewise, suction is selectively controlled, preferably by regulating the pump speed in a variable speed pump in response to the demands/desires of the operator or varying water conditions.

Figure 6:
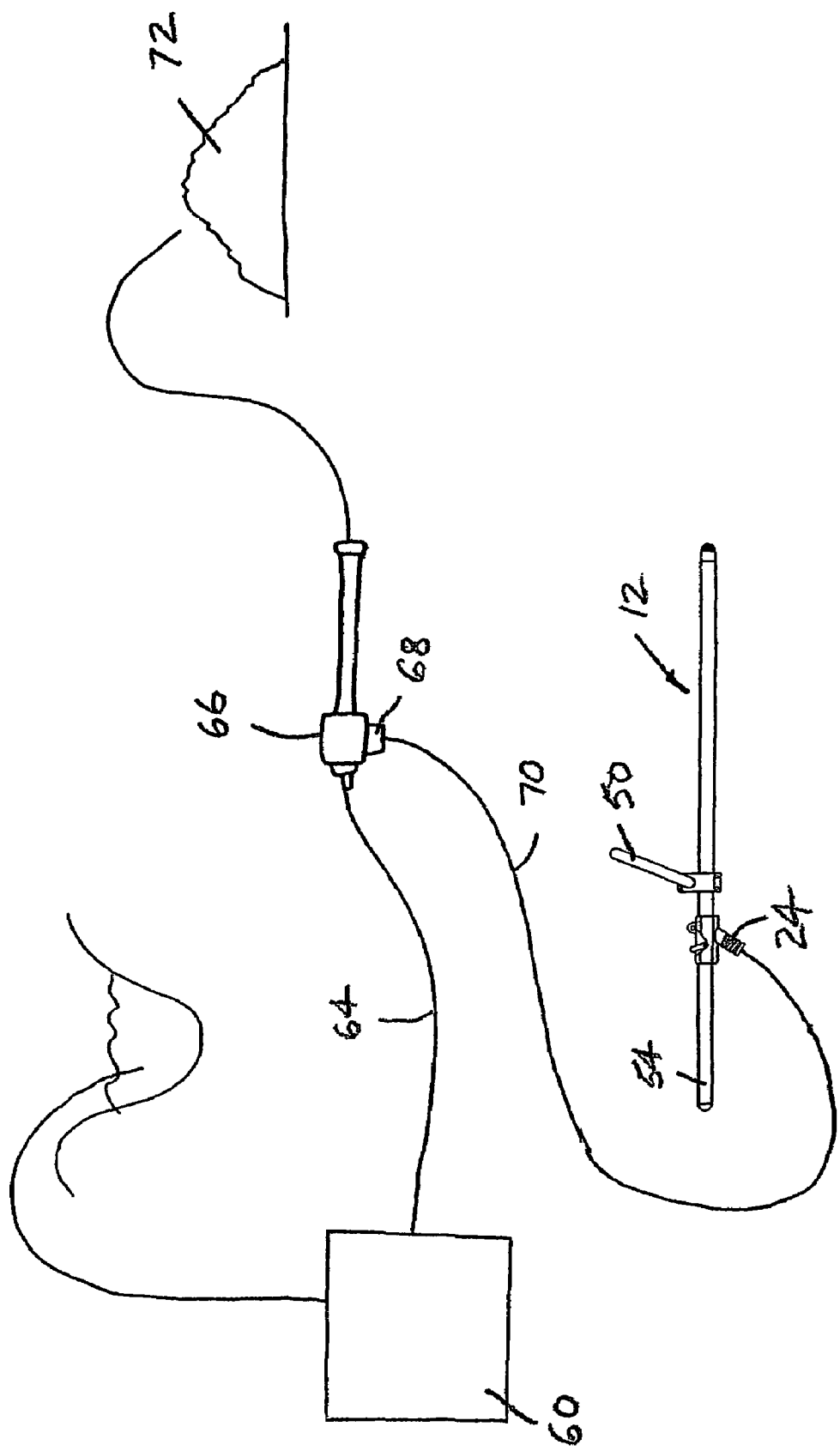
FIG. 6 is a schematic diagram showing the sediment removal process in accordance with a third embodiment of the present invention.

In another embodiment of the invention, shown in FIG. 6, the pressure line is eliminated from the sand wand assembly. In this embodiment, the sand wand merely acts as a suctioning device, without the use of a high-pressure water jet to stir up sediment in the waterway. In this embodiment, the inlet valve, pressure line, and first supply hose described in the previous embodiments are not present or used. Other aspects of the process remain substantially the same, however, with the ejector 66 creating a vacuum, which suctions sediment from the water, passes it through the suction line, connector hose, and ejector, and deposits it in a hopper or filter for collection or treatment.

The invention has been described with reference to illustrated embodiments. Obviously, modifications and alterations will occur to others upon a reading and understanding of the preceding detailed description. It is intended that the invention be construed as including all such alterations and modifications insofar as they come within the scope of the above description.

What is claimed is:

1. An apparatus for collecting sediment from a waterway, said apparatus comprising:
    a pressure line adapted for connection to an associated source of fluid pressure and having a first portion for providing pressurized fluid to an end, and a second portion adapted for connection at one end to the associated source of pressure and separately connected to a venturi;
    a suction line adjacent to and parallel with said pressure line for receiving at a first end sediment and water from the waterway collected from adjacent the pressure line end, and the suction line connected at a second end to the venturi and directing the sediment and water thereto from the waterway.

2. An apparatus for collecting sediment from a waterway, said apparatus comprising:
    a pressure line for providing pressurized fluid;
    a suction line adjacent to and parallel with said pressure line for receiving sediment and water from the waterway;
    a valve assembly operatively associated with said pressure line for regulating flow therethrough,
        wherein said valve assembly further comprises a valve stem for connecting a hose to said pressure line, an outlet connector for connecting said suction line to an ejector, and a valve for controlling the rate at which fluid passes through said pressure line, and
        wherein said valve is a variable flow valve allowing selective variable regulation of the pressure in the pressure line;
    a nose mounted on an end of said suction line; and
    wherein said pressure line is mounted in a coaxial arrangement within said suction line.

3. An apparatus according to claim 1, wherein the pressure line projects through a central portion of the end.

4. An apparatus according to claim 1, wherein the end includes a plurality of orifices.

5. An apparatus according to claim 1, further comprising a handle extending from said suction line.

6. An apparatus according to claim 1, further comprising a counterweight for counterbalancing.

7. An apparatus according to claim 1, further comprising a shoulder strap attached thereto.

8. An apparatus according to claim 1 further comprising a valve assembly operatively associated with said pressure line for regulating flow therethrough,
    wherein said valve assembly further comprises a valve stem for connecting the pressure line first portion to the valve assembly, an outlet connector for connecting the suction line to the venturi, and a valve for controlling the rate at which fluid passes through said pressure line, and
    wherein said valve is a variable flow valve allowing selective variable regulation of the pressure in the pressure line.

9. An apparatus according to claim 8, wherein said suction line, pressure line end and valve assembly are formed of a rigid, non-corroding material.

10. A method for removing sediment from an associated waterway, said method including the steps of:
    dispensing high pressure water from a pressure line mounted in a hand-held housing for providing a high pressure fluid flow against an associated sediment containing surface in an associated waterway to stir up sediment;
    directing a portion of the high pressure fluid flow through a venturi;
    applying a reduced pressure created by the high pressure fluid flow portion passing through the venturi to a suction line operatively associated with said housing to vacuum water and sediment stirred up by said high pressure water;
    separating said water from said sediment; and
    returning said separated water to said waterway.

11. A method according to claim 10, wherein said water pumped through said venturi and said high pressure water dispensed through said pressure line is provided by a pump.

12. A method according to claim 10, further comprising the step of manually controlling the amount of high pressure water dispensed through said pressure line by use of a valve.

13. A method according to claim 10, further comprising the step of adjusting the rate at which water and sediment is vacuumed through said suction line by adjusting the pump speed.

14. A method according to claim 10, wherein said housing is held and operated by an individual.

15. A method according to claim 10, wherein said housing is held by an individual using a shoulder strap and a handle mounted on said housing.

* * * * *